(12) United States Patent
Kincad et al.

(10) Patent No.: US 6,386,564 B1
(45) Date of Patent: May 14, 2002

(54) TIE ROD ASSEMBLY DESIGNED FOR AUTOMATED TOE SET

(75) Inventors: Jeffrey Lee Kincad, Clarkston; Manoj Venkatesh Bhandiwad, Utica, both of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/576,114

(22) Filed: May 22, 2000

(51) Int. Cl.$^7$ ................................................. B62D 7/99
(52) U.S. Cl. .............................. 280/93.51; 280/93.511
(58) Field of Search .......................... 280/93.502, 93.51, 280/93.511

(56) References Cited

U.S. PATENT DOCUMENTS

| | | | | |
|---|---|---|---|---|
| 3,009,712 A | * | 11/1961 | Williams | 280/95 |
| 3,547,460 A | * | 12/1970 | Gottschald | 280/95 |
| 3,605,934 A | * | 9/1971 | Millard | 180/79.2 R |
| 3,856,423 A | | 12/1974 | Uchida | 403/140 |
| 3,887,211 A | | 6/1975 | Mazur | 280/95 R |
| 4,035,094 A | | 7/1977 | Herbenar | 403/144 |
| 4,327,926 A | * | 5/1982 | Suganuma | 280/95 R |
| 4,430,016 A | | 2/1984 | Matsuoka et al. | 403/40 |
| 4,610,461 A | * | 9/1986 | Guzzetta | 280/660 |
| 4,953,894 A | * | 9/1990 | Broszat et al. | 280/846 |
| 4,974,985 A | | 12/1990 | Glatzel | 403/114 |
| 5,503,418 A | | 4/1996 | Schmidt, Jr. et al. | 280/95.1 |
| 5,529,316 A | * | 6/1996 | Mattila | 280/95.1 |
| 5,765,844 A | * | 6/1998 | Wood | 280/95.1 |
| 6,076,840 A | * | 6/2000 | Kincaid et al. | 280/124.107 |
| 6,164,860 A | * | 12/2000 | Kondo | 403/132 |

* cited by examiner

*Primary Examiner*—Eric Culbreth
*Assistant Examiner*—L. Lum
(74) *Attorney, Agent, or Firm*—Harness Dickey & Pierce, P.L.C.

(57) ABSTRACT

An adjustable tie rod assembly having a rod member and a knuckle assembly. The knuckle assembly includes a housing and an annular connector. The housing has a stem member and a bore with a longitudinal axis that is skewed to a longitudinal axis of the stem member. The annular connector is disposed in the bore in the housing. The annular connector pivotably couples the first end of the rod member to the housing. The first stem member has an engagement portion that is adapted to be secured to a relay rod.

18 Claims, 3 Drawing Sheets

TIE ROD ASSEMBLY DESIGNED FOR AUTOMATED TOE SET

BACKGROUND OF THE INVENTION

1. Technical Field

The present invention relates generally to a tie rod assemblies and more particularly to an adjustable tie rod assembly for a parallelogram-type steering system and a method for adjusting a tie rod assembly in a parallelogram-type steering system.

2. Discussion

A conventional parallelogram steering linkage system typically comprises a relay rod that is connected to the frame or chassis of an automobile by two pivoting members, such as a pitman arm and an idler, in a parallelogram arrangement so that the relay rod shifts back and forth laterally in response to steering inputs from the steering wheel of the automobile via a steering gear. The pivoting members are connected to the relay rod by ball joints. The opposite end portions of the relay rod are each connected to a steering knuckle by a tie rod assembly. The tie rod assemblies are connected to the rod by ball joints. The steering knuckles turn the front wheels of the automobile to steer the automobile in response to movements of the relay rod and the tie rods that connect the relay rod to the steering knuckles. The steering knuckles are connected to suspension members by ball joints. Some parallelogram steering linkage systems also include a drag link for moving the relay rod.

Wheel toe is the angular position of the front wheel with respect to a vertical longitudinal plane of the vehicle at zero steering input. Ideally, the wheel toe is zero so that the vehicle tracks in a straight line when the steering input is zero. The wheel toe for each front wheel is adjusted by adjusting the length of the associated tie rod assembly.

One known type of adjustable tie rod assembly has low-friction ball joints at each end and a dual jam nut arrangement for adjustment. This dual jam nut arrangement is shown in FIG. 1 to include a tie rod having oppositely threaded ends. Each threaded end is screwed into an internally threaded portion of a ball joint housing. The tie rod also carries a jam nut at each end that is tightened against the adjacent housing to maintain the depth of the threaded end in the housing. The length of the tie rod assembly is adjusted while connected in the steering linkage system by loosening the two jam nuts and turning the tie rod with respect to the two ball joint housings at the respective ends of the tie rod. The two jam nuts are then tightened down after the adjustment is made to maintain the adjustment.

A disadvantage of the dual jam nut type adjustable tie rod assembly is that two jam nuts must be loosened and then retightened to adjust the length of the assembly. The loosening of the second jam nut frequently causes the tie rod to spin, rendering it more difficult to obtain accurate and precise adjustment of the tie rod assembly. Consequently, the process of adjusting tie rods constructed in this manner can sometimes be an iterative process, especially where the technician has limited experience. Furthermore, automated tooling for adjusting the wheel toe of parallelogram-type steering systems having tie rods with dual jam nuts is not available, necessitating manual adjustment of such systems.

SUMMARY OF THE INVENTION

It is one object of the present invention to provide a parallelogram-type steering system having an easily adjusted tie rod assembly.

It is a further object of the present invention to provide a tie rod assembly for a parallelogram-type steering system having a single threaded member to secure the tie rod assembly at a desired position.

It is another object of the present invention to provide a tie rod assembly for a parallelogram-type steering system having a knuckle assembly with a housing that positions an annular connector in a skewed relation to a stem member for connection to a relay rod.

In one form, the present invention provides an adjustable tie rod assembly having a rod member and a knuckle assembly. The knuckle assembly includes a housing and an annular connector. The housing has a stem member and a bore with a longitudinal axis that is skewed to a longitudinal axis of the stem member. The annular connector is disposed in the bore in the housing. The annular connector pivotably couples the first end of the rod member to the housing. The first stem member has an engagement portion that is adapted to be secured to a relay rod.

Additional advantages and features of the present invention will become apparent from the subsequent description and the appended claims, taken in conjunction with the accompanying drawings.

DETAILED DESCRIPTION OF THE PREFERRED EMBODIMENT

Figure 2:
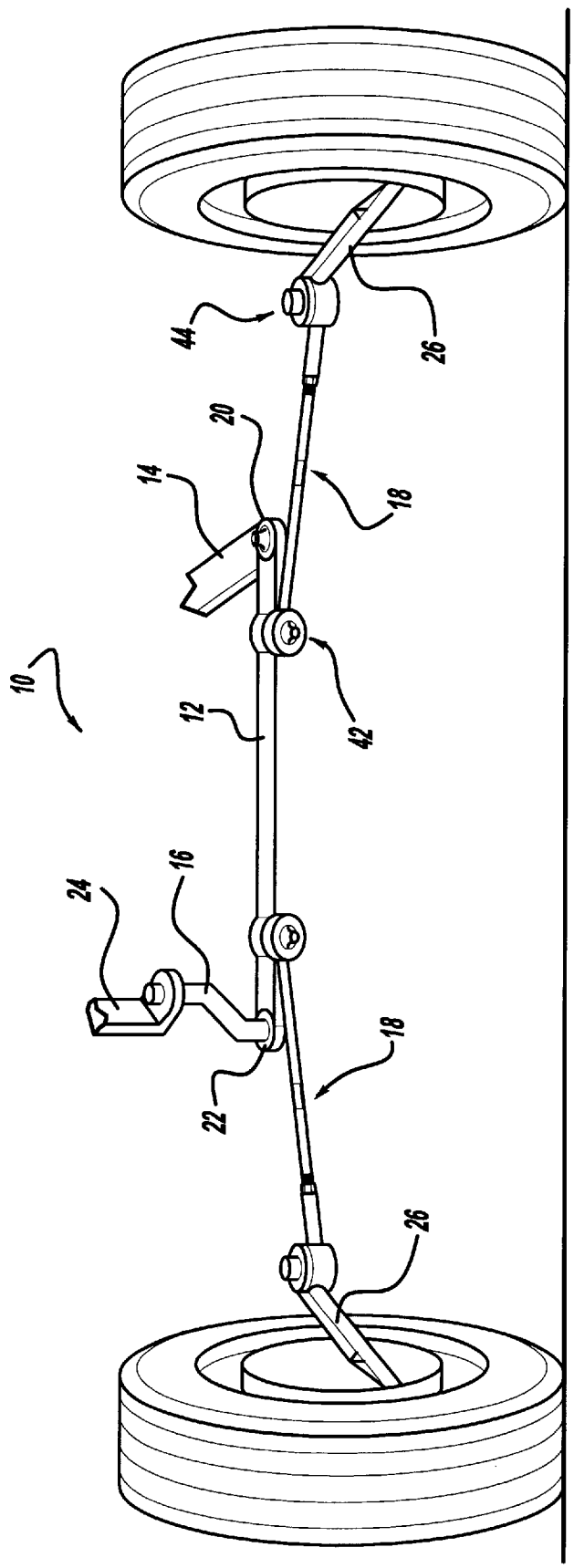
FIG. 2 is a partial schematic plan view of a vehicle having a parallelogram steering linkage system constructed in accordance with the teachings of the present invention.

With reference to FIG. 2 of the drawings, a parallelogram-type steering system constructed in accordance with the teachings of the present invention is generally indicated by reference numeral 10. Steering system 10 is schematically illustrated to include a relay rod 12, a pitman arm 14, an idler arm 16 and a pair of tie rod assemblies 18. The pitman arm 14 and the idler arm 16 are pivotably coupled to the relay rod 12 by associated ball and socket joints 20 and 22, respectively. Bracket 26 serves to mount the idler arm 16 to a vehicle chassis (not specifically shown). The tie rod assemblies 18 are each connected to the relay rod 12 at a first end and to their associated wheel bracket 26 at a second end. The pitman arm 14 is actuated by a vehicle steering wheel (not specifically shown) to provide a steering movement that transmitted to the wheel brackets 26.

Figure 1:
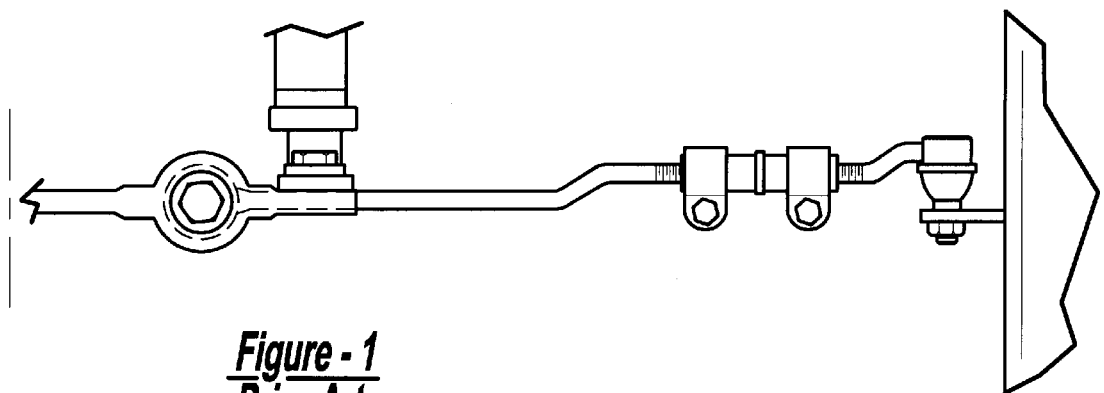
FIG. 1 is a view of a portion of a parallelogram-type steering system constructed in accordance with the teachings of the prior art.
Figure 3:
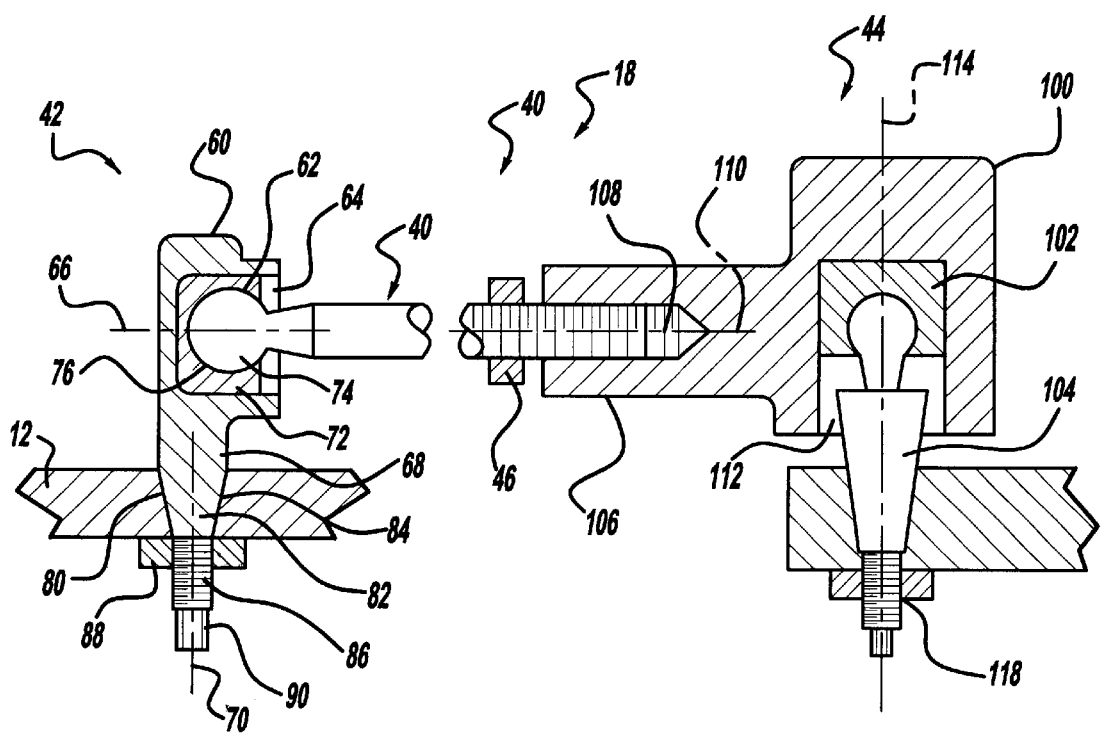
FIG. 3 is a partially sectioned view of a portion of the parallelogram steering linkage system of FIG. 2 illustrating the construction of the tie rod assembly.
Figure 4:
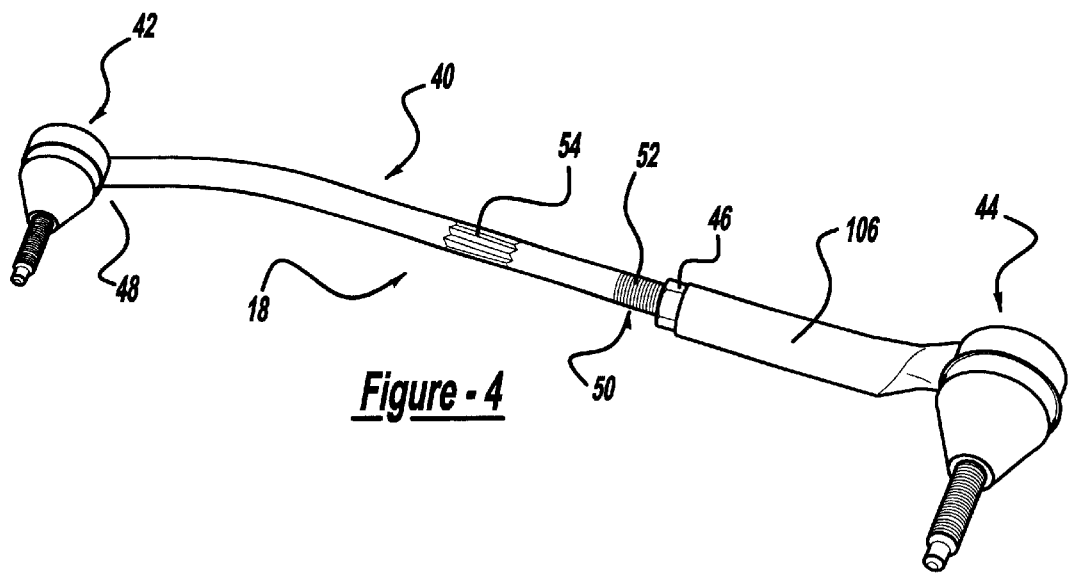
FIG. 4 is a perspective view of a portion of the parallelogram steering linkage system of FIG. 2 illustrating the tie rod assembly.

In FIGS. 3 and 4, the construction of the relay rod 12 and tie rod assemblies 18 is illustrated in greater detail. The tie rod assembly 18 is illustrated to include a rod member 40, first and second knuckle assemblies 42 and 44, and a threaded member 46. The rod member 40 includes a first end 48 that is coupled to the first knuckle assembly 42 and a second end 50 having a threaded portion 52. In the particular embodiment illustrated, the rod member 40 also includes an adjustment segment 54, the purposes of which will be discussed in detail, below.

The first knuckle assembly 42 includes a housing 60 and an annular connector 62. The housing 60 includes a bore 64 having a longitudinal axis 66 and a stem member 68 having an axis 70 that is skewed to the longitudinal axis 66 of the bore 64. The annular connector 62 is disposed in the bore 64 and is coupled to the first end 48 of the rod member 40. The annular connector 62 pivotably couples the rod member 40 to the first knuckle assembly 42 such that the rod member 40 may rotate relative to housing 60 in two orthogonal directions. In the particular embodiment illustrated, the annular connector 62 is an annular housing 72 and the first end 48 of relay rod 12 terminates at a connector member 74 having generally spherically-shaped surfaces for contacting the annular connector 62. Annular housing 72 and connector member 74 cooperate to form a ball joint 76.

The stem member 68 of the housing 60 includes an engagement portion 80 for coupling the first knuckle assembly 42 to the relay rod 12. In the example provided, the stem member 68 includes a tapered portion 82 adapted to engage a corresponding tapered aperture 84 in the relay rod 12 and a threaded portion 86. An internally threaded nut 88 is used to apply a clamping force that fixes the stem member 68 to the relay rod 12. The engagement portion 80 of the stem member 68 is also shown to include a torque-reaction portion 90 adapted to receive a reaction force produced when the first knuckle assembly 42 is coupled to the relay rod 12.

The second knuckle assembly 44 includes a housing 100, a annular connector 102 and a stem member 104. The housing 100 includes a trunk portion 106 having a threaded aperture 108 with an axis that is parallel the longitudinal axis 110 of the trunk portion 106. The threaded portion 52 of the second end 50 of the rod member 40 threadably engages the threaded aperture 108. The housing 100 also includes a bore 112 having a longitudinal axis 114 that is skewed to the longitudinal axis 110 of the trunk portion 106. The annular connector 102 is disposed in the bore 112 and pivotably couples the stem member 104 to the housing 100. The stem member 104 includes a threaded portion 118 which facilitates the connection of the tie rod assembly 18 to an associated wheel bracket 26.

The threaded member 46 is also threadably engaged to the threaded portion 52 of the second end 50 of the rod member 40. The threaded member 46 abuts the trunk portion 106, exerting a clamping force which maintains the second housing 100 in a fixed position relative to the rod member 40.

Figure 5:
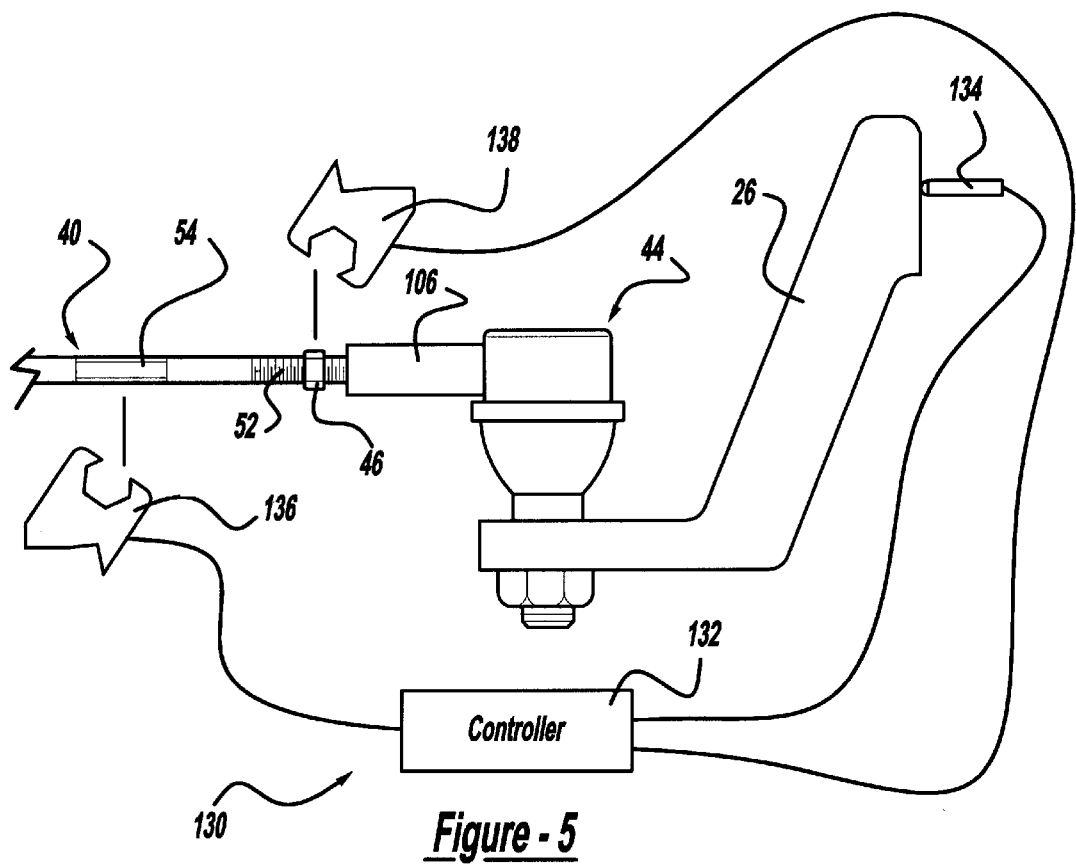
FIG. 5 is a schematic illustration of an adjustment tool for adjusting the tie rod assembly of FIG. 2.

Construction of a parallelogram-type steering system 10 with tie rod assemblies 18 advantageously permits the wheel toe of a vehicle to be adjusted with automated equipment. With reference to FIG. 5, an adjustment tool 130 is initially coupled to the adjustment segment 54 of the tie rod assembly 18. The wheel toe of the associated wheel bracket 26 is next measured.

The methodology then determines whether the wheel toe is adjusted within a predetermined angular limit. If the wheel toe is not adjusted within the predetermined angular limit, the adjustment tool 130 is then employed to adjust (i.e., rotate) the rod member 40 so that the wheel toe is adjusted within the predetermined angular limit. Those skilled in the art will readily understand that the effective length of the rod member 40 is changed as the engagement between the threaded portion 52 of the second end 50 of the rod member 40 and the threaded aperture 108 of the trunk member 106 changes.

The adjustment tool 130 preferably includes a processor 132, a gaging portion 134, and first and second tool portions 136 and 138, respectively. Gaging portion 134 is coupled to a portion of the steering system 10 to measure wheel toe. In the particular emobdiment illustrated, gaging portion 134 is coupled to a wheel bracket. First tool portion 136 is coupled to the adjustment segment 54 and second tool portion is coupled to threaded member 46. Processor 132 is operable for determining if the wheel toe is adjusted within predetermined angular limits. If the wheel toe is not adjusted within the predetermined angular limits, processor is operable for determining the rotational direction by which to turn the rod member and the angle by which to turn the rod member 40 to bring the wheel toe within the predetermined angular limit. Once the processor 132 determines the rotational direction and the angle by which to turn the rod member 40, the first tool portion 136 is next employed to rotate the rod member 40 by the angle calculated by processor 132 so as to bring the wheel toe within the predetermined angular limit. The second tool portion 138 then tightens the threaded member 46 against the trunk portion 106 of the second knuckle 44 to fix the position of the rod member 40 relative to the second knuckle 44.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An adjustable tie rod assembly comprising:
   a rod member having first and second ends, the second end having a threaded portion;
   a first knuckle assembly having a first housing and a first annular connector, the first housing having a first stem member and a bore with a longitudinal axis that is skewed to a longitudinal axis of the first stem member, the first annular connector disposed in the bore in the first housing and pivotably coupling the first end of the rod member to the first housing, the first stem member having an engagement portion adapted to be secured to a relay rod;
   a second knuckle assembly having a second housing with a trunk portion, a second stem member and a second annular connector, the second housing having a bore with a longitudinal axis that is skewed to a longitudinal axis of the trunk portion, the trunk portion having a threaded aperture with an axis parallel the longitudinal axis of the trunk portion, the second annular connector disposed in the bore, a first end of the second stem member rotatably coupled to the second annular connector; and
   a threaded member threadably engaged to the second end of the rod member and abutting the trunk portion to maintain the second housing in a fixed position relative to the rod member.

2. The adjustable tie-rod assembly of claim 1, wherein at least one of the first and second annular connectors is a housing for a ball joint.

3. The adjustable tie-rod assembly of claim 1, wherein the first end of the rod member terminate in a connector member having generally spherically-shaped surfaces for contacting the first annular connector.

4. The adjustable tie rod assembly of claim 1, wherein the rod member further includes an adjustment segment positioned between the first and second ends, the adjustment segment adapted for receiving an adjusting torque from an adjustment tool to rotate the rod member in a radial direction to adjust a length of the adjustable tie rod assembly.

5. The adjustable tie rod assembly of claim 1, wherein the engagement portion of the first stem member includes a tapered portion and a threaded portion, the tapered portion being positioned between the bore of the first housing and the threaded portion.

6. The adjustable tie rod assembly of claim 5, wherein the engagement portion of the first stem further includes a torque-reaction portion that is configured to permit the first stem to be rotationally fixed relative to the relay rod when the first knuckle assembly is being coupled to the relay rod.

7. A steering linkage system for a vehicle comprising:

a relay rod having a first and second end portion, each of the first and second end portions having a stem aperture;

a first pivoting member pivotably coupled to a first end of the relay rod;

a second pivoting member pivotably coupled to a second end of the relay rod; and a pair of adjustable tie rod assemblies, wherein each one of the pair of adjustable tie rod assemblies includes a rod member, a first knuckle assembly, a second knuckle assembly and a threaded member, the rod member having first and second ends, the second end having a threaded portion, the first knuckle assembly having a first housing and a first annular connector, the first housing having a first stem member and a bore with a longitudinal axis that is skewed to a longitudinal axis of the first stem member, the first annular connector disposed in the bore in the first housing and pivotably coupling the first end of the rod member to the first housing, the first stem member having an engagement portion, the second knuckle assembly having a second housing with a trunk portion, a second stem member and a second annular connector, the second housing having a bore with a longitudinal axis that is skewed to a longitudinal axis of the trunk portion, the trunk portion having a threaded aperture with an axis parallel the longitudinal axis of the trunk portion, the second annular connector disposed in the bore, a first end of the second stem member rotatably coupled to the second annular connector, the threaded member threadably engaged to the second end of the rod member and abutting the trunk portion to maintain the second housing in a fixed position relative to the rod member;

wherein the engagement portion of each one of the pair of adjustable tie rod assemblies is coupled to one of the first and second ends of the relay rod.

8. The adjustable tie-rod assembly of claim 7, wherein at least one of the first and second annular connectors is a housing for a ball joint.

9. The adjustable tie-rod assembly of claim 7, wherein the first end of the rod member terminate in a connector member having generally spherically-shaped surfaces for contacting the first annular connector.

10. The adjustable tie rod assembly of claim 7, wherein the rod member further includes an adjustment segment positioned between the first and second ends, the adjustment segment adapted for receiving an adjusting torque from an adjustment tool to rotate the rod member in a radial direction to adjust a length of the adjustable tie rod assembly.

11. The adjustable tie rod assembly of claim 7, wherein the engagement portion of the first stem member includes a tapered portion and a threaded portion, the tapered portion being positioned between the bore of the first housing and the threaded portion.

12. The adjustable tie rod assembly of claim 11, wherein the engagement portion of the first stem further includes a torque-reaction portion that is configured to permit the first stem to be rotationally fixed relative to the relay rod when the first knuckle assembly is being coupled to the relay rod.

13. A method for adjusting a wheel toe of a vehicle having a parallelogram-type steering system, the method comprising the steps of:

providing a parallelogram-type steering system having a tie rod assembly with a rod member, a threaded member and first and second knuckle assemblies, the first knuckle assembly having a stem member that is fixedly coupled to a relay rod at a first end along a first axis, the stem member defining a bore having an axis that is skewed to the first axis, the stem member being disposed in the bore and pivotally coupled to the rod member at a second end, the rod member having an adjustment segment and a distal threaded end threadably engaged with the threaded member and a trunk of the second knuckle assembly, the second knuckle assembly having a stem that is fixedly coupled to a steering knuckle;

coupling a tool to the adjustment segment;

measuring the wheel toe;

determining whether the wheel toe is adjusted within a predetermined angular limit;

if the wheel toe is not adjusted within the predetermined angular limit, using the tool to adjust the rod member so that the wheel toe is adjusted within the predetermined angular limit; and tightening the threaded member against the trunk portion of the second knuckle to fix a position of the rod member relative to the second knuckle.

14. The method of claim 13, wherein the step of using the tool to adjust the rod member includes the steps of:

determining a rotational direction to turn the rod member;

determining a rotational angle by which to turn the rod member; and turning the rod member in the rotational direction by the rotational angle.

15. An adjustable tie rod assembly comprising:

a first knuckle assembly having a first stem member formed along a first axis, the first stem member having an engagement portion adapted to be secured to a relay rod, the first stem member defining a bore having an axis that is skewed to the first axis; a rod member having a longitudinal axis, the rod member being disposed in the bore and pivotably coupled to the first stem such that the longitudinal axis is skewed to the first axis; and a second knuckle assembly having a housing and a second stem, the housing having a threaded aperture for threadably receiving a threaded portion of the rod member, the second stem being disposed about a second axis that is skewed to the longitudinal axis of the rod member.

16. The adjustable tie rod assembly of claim 15, further comprising a securing device for fixing the rod member relative to the knuckle assembly.

17. The adjustable tie rod assembly of claim 15, wherein the rod member includes an adjustment segment that is adapted to be engaged by a tool to thereby facilitate a toe adjustment wherein an amount by which the threaded portion of the rod member is threaded into the threaded aperture is adjusted.

18. The adjustable tie rod assembly of claim 15, wherein the engagement portion of the stem member includes a tapered portion and a threaded portion, the tapered portion being positioned between the bore of the housing and the threaded portion.

* * * * *